United States Patent
Cai et al.

(10) Patent No.: US 11,552,765 B2
(45) Date of Patent: Jan. 10, 2023

(54) RESOURCE SELECTION METHOD AND TERMINAL

(71) Applicant: Huawei Technologies Co., Ltd., Shenzhen (CN)

(72) Inventors: Yu Cai, Beijing (CN); Yongbo Zeng, Beijing (CN); Da Wang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 80 days.

(21) Appl. No.: 16/477,354

(22) PCT Filed: Jan. 26, 2017

(86) PCT No.: PCT/CN2017/072744
§ 371 (c)(1),
(2) Date: Jul. 11, 2019

(87) PCT Pub. No.: WO2018/129771
PCT Pub. Date: Jul. 19, 2018

(65) Prior Publication Data
US 2019/0386803 A1    Dec. 19, 2019

(30) Foreign Application Priority Data
Jan. 11, 2017  (CN) .......................... 201710021140.0

(51) Int. Cl.
*H04W 72/00*  (2009.01)
*H04L 5/00*  (2006.01)
*H04W 72/04*  (2009.01)

(52) U.S. Cl.
CPC ....... *H04L 5/0053* (2013.01); *H04W 72/0446* (2013.01)

(58) Field of Classification Search
CPC .... H04L 5/0053; H04W 28/26; H04W 72/02; H04W 72/0446
See application file for complete search history.

(56) References Cited

U.S. PATENT DOCUMENTS

2012/0250551 A1   10/2012   Sartori et al.
2016/0149672 A1   5/2016    Shimezawa et al.
(Continued)

FOREIGN PATENT DOCUMENTS

CN   104427486 A   3/2015
CN   104427631 A   3/2015
(Continued)

OTHER PUBLICATIONS

Machine Translation and Abstract of Chinese Publication No. CN104427486, dated Mar. 18, 2015, 22 pages.
(Continued)

*Primary Examiner* — Khaled M Kassim
*Assistant Examiner* — Zhaohui Yang
(74) *Attorney, Agent, or Firm* — Conley Rose, P.C.

(57) ABSTRACT

A resource selection method includes monitoring, by a first terminal, a first subframe, where a quantity of the first subframes is less than or equal to a quantity of second subframes; receiving, by the first terminal, indication information in the first subframe; determining, by the first terminal, a first resource in the second subframe according to the indication information; and selecting, according to the first resource, a resource in the second subframe for the first terminal to send data. There may be one or more first subframes; the second subframe may be a candidate subframe, and there may be one or more candidate subframes. The indication information includes information that can (Continued)

indicate a resource reserved by a second terminal, that is, indication information that can indicate a resource excluded by the second terminal.

17 Claims, 6 Drawing Sheets

(56) References Cited

U.S. PATENT DOCUMENTS

| | | | |
|---|---|---|---|
| 2017/0164381 | A1 | 6/2017 | Kim et al. |
| 2017/0245313 | A1 | 8/2017 | Kim et al. |
| 2019/0230643 | A1* | 7/2019 | Chae ............... H04W 72/04 |
| 2019/0281405 | A1* | 9/2019 | Chae ............... H04W 72/02 |
| 2020/0059897 | A1* | 2/2020 | Li ............... H04W 72/0446 |

FOREIGN PATENT DOCUMENTS

| | | |
|---|---|---|
| CN | 105359606 A | 2/2016 |
| CN | 105379391 A | 3/2016 |
| CN | 105764061 A | 7/2016 |
| CN | 106162533 A | 11/2016 |
| EP | 3209039 A1 | 8/2017 |
| EP | 3100567 B1 | 2/2018 |
| RU | 2573249 C2 | 1/2016 |
| WO | 2015021267 A1 | 2/2015 |
| WO | 2015152580 A1 | 10/2015 |
| WO | 2016028059 A1 | 2/2016 |

OTHER PUBLICATIONS

Machine Translation and Abstract of Chinese Publication No. CN104427631, dated Mar. 18, 2015, 20 pages.
Machine Translation and Abstract of Chinese Publication No. CN105359606, dated Feb. 24, 2016, 28 pages.
Machine Translation and Abstract of Chinese Publication No. CN105764061, dated Jul. 13, 2016, 18 pages.
Machine Translation and Abstract of Chinese Publication No. CN106162533, dated Nov. 23, 2016, 25 pages.
"3rd Generation Partnership Project; Technical Specification Group Radio Access Network; Evolved Universal Terrestrial Radio Access (E-UTRA); Medium Access Control (MAC) protocol specification (Release 14)," 3GPP TS 36.321, V14.1.0, Dec. 2016, 98 pages.
"3rd Generation Partnership Project; Technical Specification Group Radio Access Network; Evolved Universal Terrestrial Radio Access (E-UTRA); Radio Resource Control (RRC); Protocol specification (Release 14)," 3GPP TS 36.331, V14.1.0, Dec. 2016, 654 pages.
"3rd Generation Partnership Project; Technical Specification Group Radio Access Network; Evolved Universal Terrestrial Radio Access (E-UTRA); Physical layer procedures (Release 14)," 3GPP TS 36.213, V14.1.0, Part 1, Dec. 2016, 7 pages.
"3rd Generation Partnership Project; Technical Specification Group Radio Access Network; Evolved Universal Terrestrial Radio Access (E-UTRA); Physical layer procedures (Release 14)," 3GPP TS 36.213, V14.1.0, Part 2, Dec. 2016, 41 pages.
"3rd Generation Partnership Project; Technical Specification Group Radio Access Network; Evolved Universal Terrestrial Radio Access (E-UTRA); Physical layer procedures (Release 14)," 3GPP TS 36.213, V14.1.0, Part 3, Dec. 2016, 222 pages.
"3rd Generation Partnership Project; Technical Specification Group Radio Access Network; Evolved Universal Terrestrial Radio Access (E-UTRA); Physical layer procedures (Release 14)," 3GPP TS 36.213, V14.1.0, Part 4, Dec. 2016, 81 pages.
"3rd Generation Partnership Project; Technical Specification Group Radio Access Network; Evolved Universal Terrestrial Radio Access (E-UTRA); Physical layer procedures (Release 14)," 3GPP TS 36.213, V14.1.0, Part 5, Dec. 2016, 51 pages.
"3rd Generation Partnership Project; Technical Specification Group Radio Access Network; Evolved Universal Terrestrial Radio Access (E-UTRA); Physical layer procedures (Release 14)," 3GPP TS 36.213, V14.1.0, Part 6, Dec. 2016, 12 pages.
Foreign Communication From a Counterpart Application, Chinese Application No. 201780001196.8, Chinese Office Action dated Dec. 29, 2018, 7 pages.
Foreign Communication From a Counterpart Application, PCT Application No. PCT/CN2017/072744, English Translation of International Search Report dated Aug. 28, 2017, 2 pages.
Foreign Communication From a Counterpart Application, PCT Application No. PCT/CN2017/072744, English Translation of Written Opinion dated Aug. 28, 2017, 5 pages.
Huawei, et al., "Procedure for P-UE partial sensing," XP051175173, R1-1611192, 3GPP TSG RAN WG1 Meeting #87,Reno, USA, Nov. 14-18, 2016, 5 pages.
NTT Docomo, Inc., "Discussion on details of pedestrian UE partial sensing," XP051150060, R1-1610035, 3GPP TSG RAN WG1 Meeting #86bis, Lisbon, Portugal, Oct. 10-14, 2016, 3 pages.
Foreign Communication From a Counterpart Application, European Application No. 17891820.7, Extended European Search Report dated Dec. 3, 2019, 11 pages.
R1-1608649, Huawei, "Discussion on the P-UE resource selection," 3GPP TSG RAN WG1 Meeting #86bis, Lisbon, Portugal, Oct. 10-14, 2016, 5 pages.
R1-1609734, Ericsson, "Support for smaller resource reservation periods in V2X," 3GPP TSG RAN WG1 Meeting #86bis, Lisbon, Portugal, Oct. 10-14, 2016, 6 pages.
R1-1612687, NTT Docomo, Inc., "Details of resource selection using partial sensing by pedestrian UE," 3GPP TSG RAN WG1 Meeting #87, Reno, USA, Nov. 14-18, 2016, 7 pages.
R1-1613604, Huawei et al., "WF on P-UE sensing timeline in partial sensing," 3GPP TSG RAN WG1 Meeting #87, Reno, USA, Nov. 14-18, 2016, 5 pages.
R1-1613801, Motorola Mobility, "Corrections to 36.213 on V2V," 3GPP TSG-RAN WG1 Meeting #87, Reno, USA, Nov. 14-18, 2016, 2 pages.
R1-166723, Samsung, "Resource selection for pedestrian UE," 3GPP TSG RAN WG1 #86, Gothenburg, Sweden Aug. 22-26, 2016, 3 pages.
R1-168251, RAN WG1, "LS on RAN1 agreements in sidelink-based V2V," 3GPP TSG RAN WG1 Meeting #86, Gothenburg, Sweden, Aug. 22-26, 2016, 5 pages.
Huawei et al,"Further NB-IoT random access physical layer aspects", 3GPP TSG RAN WG1 NB-IoT Ad-Hoc Meeting, R1-160035, Budapest, Hungary, Jan. 18-20, 2016, total 3 pages.
Intel Corporation,"Transmitter behavior for sidelink resource (re)selection", 3GPP TSG RAN WG1 Meeting #86, R1-166512, Gothenburg, Sweden, Aug. 22-26, 2016, total 6 pages.
CATT,"Discussion on shorter resource reservation period in PC5-based V2V", 3GPP TSG RAN WG1 Meeting #87, R1-1611337, Reno, USA Nov. 14-18, 2016, total 7 pages.
Intel Corporation,"Partial sensing for P2V communication", 3GPP TSG RAN WG1 Meeting #87, R1-1611923, Reno, USA Nov. 14-18, 2016, total 5 pages.

* cited by examiner

RESOURCE SELECTION METHOD AND TERMINAL

CROSS-REFERENCE TO RELATED APPLICATIONS

This application is a U.S. National Stage of International Patent Application No. PCT/CN2017/072744 filed on Jan. 26, 2017, which claims priority to Chinese Patent Application No. 201710021140.0 filed on Jan. 11, 2017. Both of the aforementioned applications are hereby incorporated by reference in their entireties.

TECHNICAL FIELD

Embodiments of this application relate to the field of communications technologies, and in particular, to a resource selection method and a terminal.

BACKGROUND

Device-to-device (Device-to-Device, D2D) communication based on a cellular network, also referred to as a proximity service (Proximity Service, ProSe) in the 3GPP, is a new technology that allows, under system control, terminals to directly communicate with each other by reusing cell resources. The new technology can increase spectrum efficiency of a cellular communications system, reduce transmit power of a terminal, and to some extent, alleviate a problem of spectrum resource shortage of a wireless communications system.

In V2X communication, service traffic of a terminal is periodic. For example, for a cooperative awareness message (Cooperative Awareness Message, CAM), a shortest period is 100 ms and a longest period is 1 s. The terminal is capable of predicting a traffic periodicity. Therefore, a UE resource reservation solution is added in V2X, and the terminal may notify another terminal that the terminal needs to reserve a future time-frequency resource. In addition, when selecting a time-frequency resource for sending data, the terminal needs to consider a resource reserved by another terminal, so as to avoid selecting the resource that has been reserved by the another terminal as much as possible. That is, the terminal needs to perform monitoring when selecting a time-frequency resource.

In a time domain, there is an interval between a monitoring subframe of a terminal a and a subframe in which a candidate resource is located. Therefore, as shown in FIG. 1, if a terminal b indicates, in a subframe in which a resource X is located, that a frequency resource Y after 20 ms is reserved, the frequency resource Y is in a candidate resource of the terminal a, and the resource X is not in the monitoring subframe of the terminal a. Because the terminal a does not perform monitoring in the subframe in which the resource X is located, the terminal a does not know that the resource Y has been reserved. If the terminal a selects the resource Y to send data, a collision occurs.

SUMMARY

Embodiments of this application provide a resource selection method and a terminal. A monitoring subframe and a candidate subframe are appropriately determined, so as to obtain a more appropriate quantity of monitoring subframes. This reduces a probability of a resource collision during data transmission.

According to a first aspect, an embodiment of this application provides a resource selection method. The method includes: monitoring, by a first terminal, a first subframe, where a quantity of the first subframes is less than or equal to a quantity of second subframes, receiving, by the first terminal, indication information in the first subframe; determining, by the first terminal, a first resource in the second subframe according to the indication information; and selecting, according to the first resource, a resource in the second subframe for the first terminal to send data. The first terminal may monitor a resource in the first subframe, and the first subframe may include one or more subframes. The second subframe may be a candidate subframe, the candidate subframe is a subframe in which a candidate resource of the first terminal is located, the first terminal selects a resource in the candidate resource for sending data, and the candidate subframe may be one or more subframes. The indication information includes information about a resource reserved by a second terminal. A monitoring subframe and a candidate subframe are appropriately determined, so as to obtain a more appropriate quantity of monitoring subframes and a more appropriate quantity of candidate subframes. This reduces a probability of a resource collision during data transmission.

In a possible implementation, the method further includes: determining, by the first terminal, the quantity of the first subframes according to at least one first parameter, where a value of the first parameter is included in a value range of a resource reservation interval. According to this embodiment of this application, it can be implemented that the quantity of monitoring subframes is determined according to a possible value of the resource reservation interval, so as to obtain a more appropriate quantity of the monitoring subframes. This not only increases monitoring efficiency, but also reduces a probability that the indication information is not in the monitoring subframe, and reduces a probability of a resource collision during data transmission.

In another possible implementation, the first parameter is equal to a product of a value of a third parameter less than 1 and a second parameter. The third parameter may be a parameter that is configured by a network-side device or preconfigured and that is used for the first terminal to determine a monitoring subframe; or the third parameter is a restrict resource reservation period parameter that is configured by a network-side device or preconfigured. A value of a resource reservation field of the terminal that is included in the indication information and that is used to indicate that a reserved resource is limited by the restrict resource reservation period parameter, for example, may be limited by using the third parameter. The third parameter may be a parameter R or a parameter k, and the second parameter may be a scale factor that is used to determine the resource reservation interval. For example, a value of the resource reservation interval is obtained by multiplying, by the second parameter, the resource reservation field of the terminal that is included in the indication information and that is used to indicate the reserved resource. According to this embodiment of this application, the quantity of the monitoring subframes may be determined according to the parameter that is used for the first terminal to determine the monitoring subframe or the restrict resource reservation period parameter, so as to obtain a more appropriate quantity of the monitoring subframes. This not only increases monitoring efficiency, but also reduces a probability that the indication information is not in the monitoring subframe in a case of a short resource reservation interval.

In still another possible implementation, the quantity of the first subframes is equal to a minimum value of the quantity of the second subframes and the first parameter.

In yet another possible implementation, the quantity of the first subframes is equal to a minimum value of a maximum value of the first parameter and the quantity of the second subframes.

In yet another possible implementation, an interval between a last subframe of the first subframe and a last subframe of the second subframe is determined according to at least one of the first parameter, the quantity of the second subframes, or the second parameter, and the value of the first parameter is included in the value range of the resource reservation interval. According to this embodiment of this application, a location of the monitoring subframe can be more appropriately determined. This avoids that the indication information based on a short resource reservation interval cannot be monitor d due to an excessively long interval between a monitoring subframe and a candidate subframe, and thereby reduces a probability that an excluded resource cannot be determined, and reduces a probability of a resource collision during data transmission.

In yet another possible implementation, that an interval between a last subframe of the first subframe and a last subframe of the second subframe is determined according to at least one of the first parameter, the quantity of the second subframes, or the second parameter includes:

the interval between the last subframe of the first subframe and the last subframe of the second subframe is greater than or equal to a fourth parameter and less than or equal to a fifth parameter, where the fourth parameter is greater than or equal to a maximum value of the first parameter and the quantity of the second subframes, and the fifth parameter is less than or equal to the second parameter.

In yet another possible implementation, the last subframe of the first subframe is in a subframe previous to a subframe in which the first terminal determines that a set of resources are excluded; or the interval between the last subframe of the first subframe and the last subframe of the second subframe is a sixth parameter, where the sixth parameter is not greater than the second parameter. According to this embodiment of this application, it can be implemented that the location of the monitoring subframe is determined according to a preset rule, for example, a fixed shift of a monitoring subframe. This not only increases monitoring efficiency, but also reduces a probability of a resource collision during data transmission.

In yet another possible implementation, the determining, by the first terminal, a first resource in the second subframe according to the indication information includes: determining, by the first terminal, the first resource according to a seventh parameter and a target parameter, where the indication information is used to indicate the target parameter, and the seventh parameter is determined according to the target parameter. The indication information may be the information used to indicate the resource reserved by the second terminal, and the target parameter may be the value of the resource reservation field. The seventh parameter may be a quantity of resource reservation times.

In yet another possible implementation, that the seventh parameter is determined according to the target parameter includes: the seventh parameter is obtained by dividing 1 by the target parameter. According to this embodiment of this application, it can be implemented that a quantity of reservation times of the reserved resource is increased. This avoids that the indication information based on a short resource reservation interval cannot be monitor d due to an excessively long interval between a first subframe and a candidate subframe, and thereby reduces a probability that an excluded resource cannot be determined.

In yet another possible implementation, that the seventh parameter is determined according to the target parameter includes: the seventh parameter is obtained by dividing a minimum value of at least one third parameter not less than 1 by the target parameter, and the third parameter is a parameter that is configured by a network-side device or preconfigured and that is used for the first terminal to determine the first subframe. According to this embodiment of this application, it can be implemented that a quantity of reservation times of the reserved resource is increased. This avoids that the indication information based on a short resource reservation interval cannot be monitor d due to an excessively long interval between a monitoring subframe and a candidate subframe, and thereby reduces a probability that an excluded resource cannot be determined.

In yet another possible implementation, the quantity of the second subframes does not exceed the first parameter, and the value of the first parameter is included in the value range of the resource reservation interval. According to this embodiment of the present invention, the quantity of the monitoring subframes may be less than the quantity of candidate subframes, so that the monitoring subframes are more targeted. This reduces a probability of a resource collision during data transmission.

In yet another possible implementation, the value range of the resource reservation interval is equal to a product of a value of a resource reservation field less than 1 in a value range and the second parameter.

According to a second aspect, an embodiment of this application provides a resource selection apparatus. The apparatus specifically includes: a monitoring unit, configured for a first terminal to monitor a first subframe, where a quantity of the first subframes is less than or equal to a quantity of second subframes; a receiving unit, configured to receive indication information in the first subframe; a processing unit, configured to determine a first resource in the second subframe according to the indication information; and a sending unit, configured to select, according to the first resource, a resource in the second subframe for the first terminal to send data.

According to a third aspect, an embodiment of this application provides a terminal, including: a processor, configured for a first terminal to monitor a first subframe, where a quantity of the first subframes is less than or equal to a quantity of second subframes; a receiver, configured to receive indication information in the first subframe, where the processor is further configured to determine a first resource in the second subframe according to the indication information; and a transmitter, configured to select, according to the first resource, a resource in the second subframe for the first terminal to send data.

According to a fourth aspect, an embodiment of this application provides a computer storage medium, configured to store a computer software instruction used by the foregoing terminal, where the computer storage medium includes a program designed for executing the first aspect and optional implementations.

According to a fifth aspect, an embodiment of this application provides a computer program product, configured to store a computer software instruction used by the foregoing terminal, where the computer program product includes a program designed for executing the first aspect and optional implementations.

According to a sixth aspect, an embodiment of this application provides a communications system, where the communications system includes any terminal in the third aspect and optional implementations.

DESCRIPTION OF EMBODIMENTS

The applicant of this application finds, by analyzing the prior art, that reasons why a reservation instruction is not monitor d are that a resource reservation time interval is excessively short, an interval between a monitoring subframe and a candidate subframe is excessively long, a quantity of candidate subframes is excessively large, and the like.

For example, in a current standard, it is defined that a terminal uses a resource reservation field in sidelink control information (Sidelink Control Information, SCI) to indicate that a future time-frequency resource is excluded from transmission of another transmission block (Transmission block, TB). A possible value range of the resource reservation field is ($\frac{1}{5}$, $\frac{1}{2}$, 1, 2, 3, 4, 5, 6, 7, 8, 9, 10). If a value of the resource reservation field is represented by R, and a resource reservation interval is obtained by multiplying R by a value P, it indicates that a resource in an $(R*P)^{th}$ subframe next to a subframe in which the SCI is located is reserved. In the current standard, a value of P is 100. For example, an index of the subframe in which the SCI is located is m, a value of the resource reservation field in the SCI is R=2, P=100, and an index of a subframe in which a reserved resource is located is m+R*P=m+200. A value of the resource reservation field may be preconfigured, or may be configured by a network-side device by using a restrict resource reservation period parameter.

The resource reservation field is limited to some values in the value range ($\frac{1}{5}$, $\frac{1}{2}$, 1, 2, 3, 4, 5, 6, 7, 8, 9, 10) only. For example, a base station may configure that the resource reservation field may be selected from ($\frac{1}{5}$, 1, 2, 10), and the terminal can select a value of the resource reservation field from ($\frac{1}{5}$, 1, 2, 10) only. A value less than 1 is corresponding to a short reservation interval.

If a set of frequency resources in a subframe whose index is n are resources that the terminal uses to transmit data, a same frequency resource in a subframe whose index is (n+the resource reservation interval) is also a resource that the terminal uses to transmit data.

Figure 1:
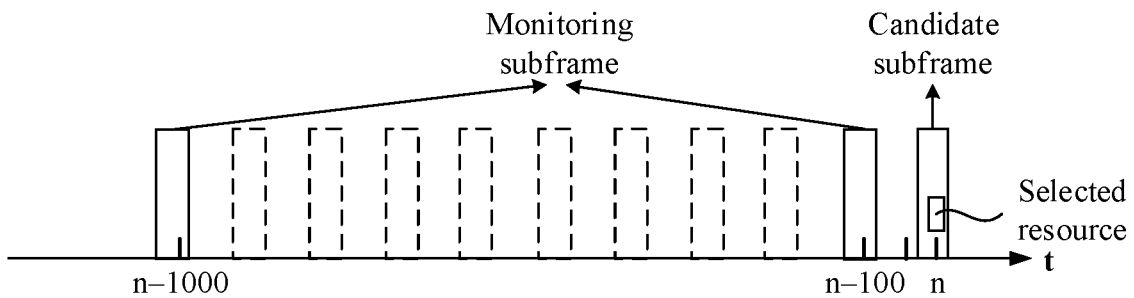
FIG. 1 is an example of this application.
Figure 2:
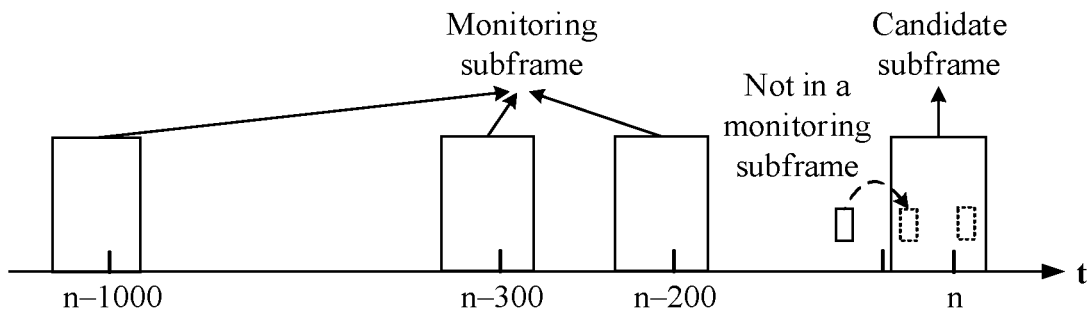
FIG. 2 is another example.

When selecting a resource, the terminal selects Y subframes as possible candidate resources. For a candidate resource in any subframe n of the Y subframes, P-UE needs to monitor a subframe (n−P*k), in this case, it may be considered that an interval between the monitoring subframe and the candidate subframe is P*k. A minimum value of Y and a set k may be configured by the network-side device or preconfigured. A value range of k is [1,10], and [1, 10] represents a set (1, 2, 3, 4, 5, 6, 7, 8, 9, 10). As shown in FIG. 2, when it is configured that k=1, 10, for a candidate resource in any subframe n of the Y subframes, the P-UE needs to monitor a subframe (n−100) and a subframe (n−1000). A value of a resource reservation field of a terminal b may be a number less than 1, for example, $\frac{1}{5}$ or $\frac{1}{2}$, and a reservation interval of the terminal is $\frac{1}{5}*P$ or $\frac{1}{2}*P$. An interval between a monitoring subframe and a candidate subframe that are of a terminal a is P*k, and k is a number greater than or equal to 1 in the current standard. Therefore, the interval between the monitoring subframe and the candidate subframe that are of the terminal a is greater than the resource reservation interval of the terminal b.

Figure 3:
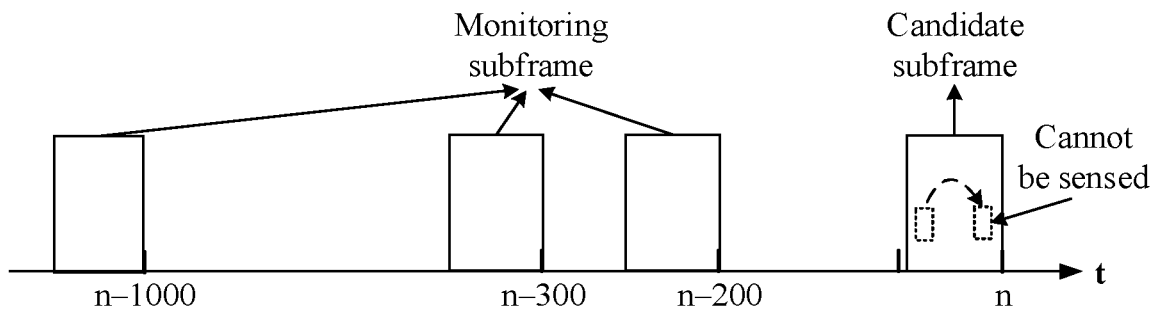
FIG. 3 is still another example.

For another example, a quantity of subframes in which candidate resources of the terminal a are located is greater than some short resource reservation periods, for example, 20 ms, and a time window corresponding to a candidate resource is 40 ms. As a result, a case shown in FIG. 3 occurs: If the terminal b indicates, in a subframe in which a resource X is located, that a frequency resource Y after 20 ms is reserved, both the frequency resource X and the resource Y are in the candidate resources of the terminal a.

Figure 4:
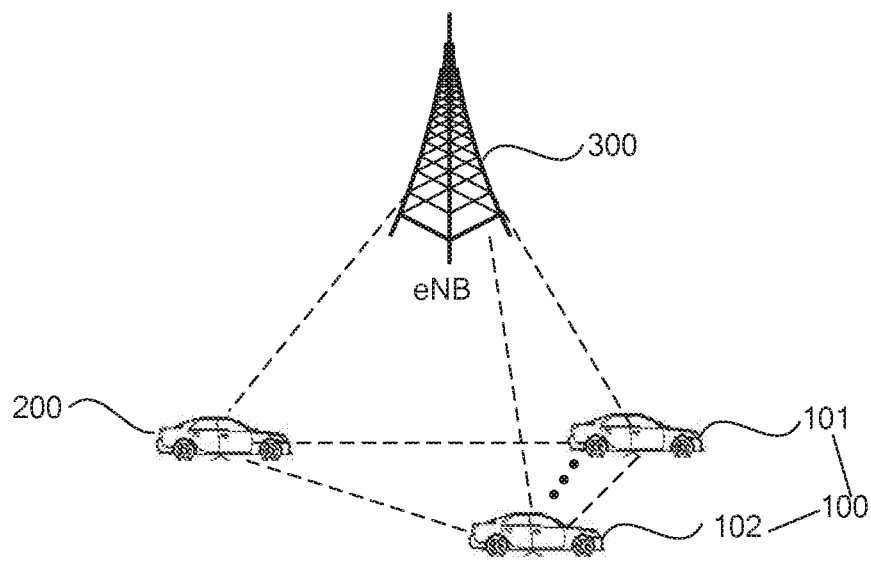
FIG. 4 is a schematic diagram of an application scenario of V2X communication.

To resolve the foregoing technical problem, the embodiments of this application provide a resource selection method and a terminal. The method in the embodiments of this application is applicable to D2D communication, particularly to V2X communication. FIG. 4 is a schematic diagram of an application scenario of V2X communication. As shown in FIG. 4, a terminal 100, a terminal 200, and a base station 300 are included. The terminal 100 and the terminal 200 are connected to the base station 300 by means of a wireless connection, and the terminal 100 and the terminal 200 communicate with each other by using a D2D communications protocol, for example, a V2X-based communications protocol.

Terminals in the embodiments of this application may include a mobile phone, a tablet computer, a personal digital assistant (Personal Digital Assistant, PDA), a point of sales (Point of Sales, POS), an in-vehicle computer, and the like.

It should be understood that the disclosed method can be applied to any quantity of different systems, and is not specifically limited to an operating environment shown herein. Similarly, a system shown in FIG. 4 is merely an example, and may include more base stations and terminals in actual application. This does not constitute a limitation.

In the following, the solutions of the embodiments of this application are described with reference to figures.

Figure 5:
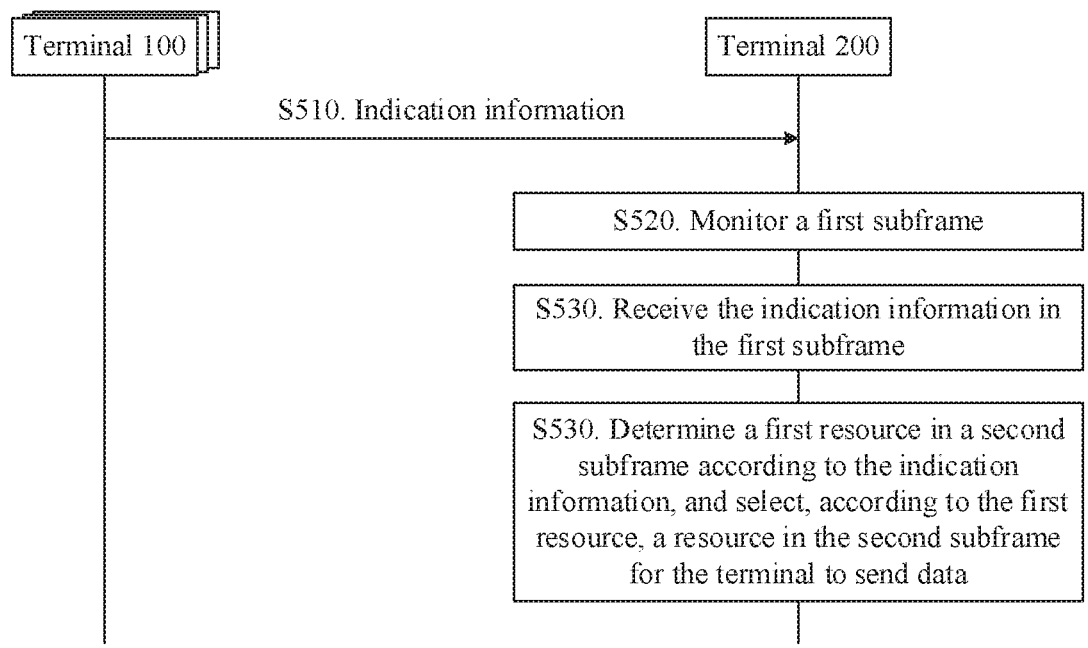
FIG. 5 is a schematic diagram of signaling interaction in a resource selection method according to an embodiment of this application.

FIG. 5 is a schematic diagram of signaling interaction in a resource selection method. As shown in FIG. 5, the method according to this embodiment of this application includes the following steps.

S510. A terminal 100 sends indication information.

The indication information is used to indicate a reserved resource. The terminal 100 uses the reserved resource to send data.

The indication information may include a resource reservation field of the terminal 100. For example, the indication information may be SCI information of the terminal 100, and the SCI information includes the resource reservation field. The indication information may further include a resource reservation interval of the terminal 100. The resource reservation interval may be represented in a form of P*R, or may directly be a time, for example, 50.

A value of the resource reservation field of the terminal that is included in the indication information and that is used to indicate a reserved resource may be configured by a network-side device or preconfigured.

S520. A terminal 200 monitor s a first subframe, where the first subframe may include one or more subframes, and a quantity of the first subframes is less than or equal to a quantity of second subframes (that is, candidate subframes).

Assuming that a parameter that is used to determine a monitoring subframe by the terminal is represented as k, and a second parameter is represented as P, for a resource reservation period greater than or equal to the second parameter, the monitoring subframe is n−P*k, where a subframe n is any subframe of the candidate subframe.

The first subframe is determined according to at least one of at least one first parameter, a quantity of the candidate subframes, or the second parameter. There are multiple specific determining manners, detailed descriptions are provided in subsequent embodiments, and details are not described herein.

The second parameter may be a scale factor that is used to determine a resource reservation interval. For example, a value of the resource reservation interval is obtained by multiplying, by the second parameter, the resource reservation field of the terminal that is included in the indication information and that is used to indicate the reserved resource.

A value of the first parameter is equal to one of possible values of the resource reservation interval. That is, the value of the first parameter is included in a value range of the resource reservation interval. The first parameter may be a time such as 20, or represented by a product of a value of a third parameter less than 1 and the second parameter. For example, the first parameter is represented in a form of P*R or P*k, where value ranges of k and R are values greater than 0 and less than 1. The third parameter may be R or k, and the second parameter is P. Alternatively, the terminal 200 needs to determine P and R or P and k, respectively, and then obtains the first parameter by means of calculation.

There may be one or more first parameters that are used to determine the first subframe.

For example, the terminal 200 determines, according to preconfigured information or according to information sent by a base station, that the resource reservation field is limited to any one in (⅕, ½, 1, 2, 3, 4, 5, 6, 7, 8, 9, 10), where the preconfigured information or the information sent by the base station includes a restrict resource reservation period parameter. The value of the first parameter is equal to P*R. In this case, R is equal to ⅕ or ½. The first subframe is determined according to one or more of ⅕*P or ½*P. If the restrict resource reservation period parameter is any one in (⅕, 3, 4), the value of the first parameter is equal to P*R. In this case, R is equal to ⅕. The first subframe is determined according to ⅕*P.

For another example, the terminal 200 determines, according to preconfigured information or according to information sent by a base station, that a value of k is in (⅕, ½, 1, 2, 3, 4, 5, 6, 7, 8, 9, 10), where the preconfigured information or the information sent by the base station includes the parameter k that is used to determine the monitoring subframe by the terminal. The value of the first parameter is equal to P*k. In this case, k is equal to ⅕ or ½. One or more first subframes are determined according to one or more of ⅕*P or ½*P. If the parameter k that is used to determine the monitoring subframe by the terminal is in (½, 1, 2, 3, 4, 5, 10), the value of the first parameter is equal to P*k. In this case, k is equal to ½. The one or more first subframes are determined according to one or more of ½*P.

For another example, the possible values of the resource reservation interval are (20, 50, 100, 200, 300, 400, 500, 600, 700, 800, 900, 1000), and the value of the first parameter is equal to 20 or 50. P is equal to 100. The first subframe is determined according to one or more of 20 or 50.

For another example, possible values of the resource reservation field are (⅕, ½, 1, 2, 3, 4, 5, 6, 7, 8, 9, 10), and the value of the first parameter is equal to ⅕*P or ½*P. The first subframe is determined according to one or more of ⅕*P or ½*P.

It should be noted that a sequential order of S510 and S520 is not limited. The terminal 100 may perform S510 in the process in which the terminal 200 performs S520.

S530. The terminal 200 receives, in the first subframe, the indication information sent by the terminal 100.

When monitoring the first subframe, the terminal 200 may monitor indication information sent by another terminal in the first subframe. For example, the another terminal may be the terminal 100.

S540. The terminal 200 determines a first resource (that is, a resource that may be excluded) in the second subframe (that is, the candidate subframe) according to the indication information, and selects, according to the first resource, a resource in the second subframe for the terminal 200 to send data.

The terminal 200 may monitor, in the first subframe, indication information sent by multiple terminals. When selecting a resource for sending data, the terminal 200 may exclude all resources reserved by another terminal in the candidate subframe.

If the indication information sent by the another terminal indicates that a resource reserved by the another terminal is in the second subframe, the terminal 200 excludes the reserved resource according to a specific criterion, and selects, from a remaining resource in the second subframe, a resource for sending data. A criterion for excluding a resource may be a priority of data sent by the another terminal, or energy on a resource for sending data or indication information.

According to this embodiment of this application, one or more monitoring subframes are determined according to one or more of the parameter P, the value of the resource reservation field, the parameter k, the candidate subframe, or other information, for monitoring. This ensures that a quantity of the monitoring subframes is not greater than a quantity of the candidate subframes, so as to obtain a more appropriate quantity of monitoring subframes. This reduces a probability of a resource collision during data transmission.

In addition, resource reservation intervals of a terminal may be different. For each different resource reservation interval, the terminal determines one or more candidate subframes, and per forms S520 and S530, so as to monitor reservation information that is based on different resource reservation intervals, determine reserved resources of these terminals, and further, select, from candidate resources according to the reserved resources, a resource for sending data.

The determining the first subframe according to at least one of the first parameter, the quantity of the candidate subframes, or the second parameter may specifically include the following implementations:

In an implementation, the terminal 200 determines the quantity of the first subframes according to the first parameter. An interval between a last subframe of the first subframe and a last subframe of the second subframe (the candidate subframe) is greater than or equal to a fourth parameter and less than or equal to a fifth parameter. The fourth parameter is greater than or equal to a maximum value of the first parameter and the quantity of the second subframes, and the fifth parameter is less than or equal to the second parameter. For example, the interval between the last subframe of the first subframe and the last subframe of the second subframe that are of the terminal 200 is determined according to at least one of the first parameter, the quantity of the candidate subframes, or the second parameter.

In an example, the quantity of the first subframes is equal to a minimum value of a maximum value of the first parameter and the quantity of the candidate subframes. That is, the quantity of the first subframes is M, M=min(Y,R*P), and Y is the quantity of the candidate subframes. The minimum value may be configured by the network-side device or preconfigured. A value of the parameter P may be 100, the first parameter is R*P, and a value of R is greater than 0 and less than 1. For example, R is one or more of ⅕ or ½. A value range of an offset is [a,b]. The offset may be selected based on UE implementations. That is, the offset may be any value in [a, b], where a is the fourth parameter and not less than the minimum value of the maximum value of the first parameter and the quantity of the candidate subframes, that is, a≥max(Y,R*P). In this case, a value of R is the same as a value of R that is used to calculate the quantity of the first subframes; and b is the fifth parameter, and b≤P.

In another example, the quantity of the first subframes is equal to a minimum value of a maximum value of the first parameter and the quantity of the candidate subframes. That is, the quantity of the first subframes is M=min(Y,max(R)*P) or M=min(Y,max(R*P)). A value range of an offset is [a,b], and the offset may be selected based on UE implementations, where a≥max(Y,max(R)*P) and b≤P. In this case, a value of R is greater than 0 and less than 1. For example, R is one or more of ⅕ or ½.

In still another example, the quantity of the first subframes is M=min(Y,max(R)*P) or M=min(Y,max(R*P)). A location of the first subframe is determined according to a preset rule. The determining the locations of the multiple first subframes according to the preset rule includes:

the first subframe is one or more subframes previous to a subframe m in which the UE determines that a set of resources are to be excluded, that is, M subframes are [m−1,m−M]; the first subframe is one or more subframes previous to a subframe m in which the LTE determines to perform resource selection or reselection, that is, M subframes are [m−1,m−M]; or the interval between the last subframe of the first subframe and the last subframe of the second subframe is a sixth parameter, where the sixth parameter is not greater than the second parameter.

For example, an interval (that is, the sixth parameter) between a last subframe of M first subframes and a last subframe of subframes in which Y candidate resources are located is a fixed value or a preconfigured fixed value. A value of the interval is within a range [max(Y,max(R)*P),P].

In addition, that the terminal 200 determines, according to the indication information, a resource excluded from the candidate subframe, and selects, according to the excluded resource, a resource in the candidate subframe for the terminal 200 to send data may further include the following manner.

The terminal 200 determines the first resource according to a seventh parameter and a target parameter. The indication information is used to indicate the target parameter, and the seventh parameter is determined according to the target parameter. For example, the terminal 200 determines the excluded resource (that is, the first resource) according to a quantity of reservation times (that is, the seventh parameter) and the target parameter. The indication information sent by the terminal 100 includes the target parameter, and the target parameter is the value of the resource reservation field of the terminal 100.

In addition, assuming that the seventh parameter is equal to 2, and that SCI sent by another terminal indicates that a set of frequency resources in a subframe whose index is n is a resource that the another terminal uses to transmit data, same frequency resources in a subframe whose index is (n+the target parameter multiplied by the parameter P) and a subframe whose index is (n+the target parameter multiplied by the parameter P multiplied by 2) are also resources that the another terminal uses to transmit to data. That is, the two resources are reserved by the another terminal. When a specific criterion is met, the terminal 200 excludes the two reserved resources, and selects a resource from the remaining resources to send data.

That the seventh parameter (that is, the quantity of reservation times) may be determined according to the target parameter may specifically include the following manners:

Manner 1: The quantity of reservation times is obtained by dividing 1 by the target parameter. For example, a possible value of the target parameter is ⅕ or ½. When the target parameter is ⅕, the quantity of reservation times is 5.

Manner 2: The quantity of reservation times is obtained by dividing a minimum value of at least one third parameter not less than 1 by the target parameter. The third parameter is a minimum value of a parameter not less than 1 that is configured by a network-side device or preconfigured and that is used to determine the first subframe by the terminal 200. For example, a value range of the parameter k that is configured by the network-side device or preconfigured and that is used to determine the first subframe by the terminal 200 may be (⅕, ½, 2, 3, 4, 6, 8, 9, 10), the fourth parameter is equal to 2, and the quantity of reservation times is obtained by dividing 2 by the target parameter.

In another implementation, the quantity of the candidate subframes may be determined according to the first parameter. For example, the quantity of the candidate subframes does not exceed the minimum value of the first parameter.

In an example, for all R values (0<R<1), a minimum value of R is R_min, and the quantity of the candidate subframes of the terminal 200 cannot exceed R_min*p or min(R*P). For all R values, the first subframe of the terminal 200 is n−P*R, where a subframe n is any one of subframes in which the Y candidate resources are located. The terminal 200 receives a reservation instruction in the first subframe, and does not increase the quantity of reservation times. The first parameter is R*P.

R may be a parameter that is configured by the network-side device or preconfigured to limit a value of a "resource reservation" field, or information about the parameter k that is configured by the network-side device or preconfigured and that is used to determine the monitoring subframe. Specifically, R is a value of the restrict "resource reservation" field parameter less than 1. Alternatively, R is a value of the parameter k less than 1 that is used to determine the monitoring subframe. For example, the value of the restrict "resource reservation" field parameter less than 1 is ½ or ⅕, and R=½ or ⅕. For another example, the value of the parameter k less than 1 that is used to determine the monitoring subframe is ½, and R=½.

In still another implementation, in an embodiment in which there are multiple reservation times, the quantity of reservation times may be applied to only subframes in which the candidate resources are located. If a reserved resource is not in the subframes in which the candidate resources are located, UE considers that the resource is not reserved.

In yet another implementation, a first terminal determines the first resource according to the target parameter. The indication information may be used to indicate the target parameter. For example, the indication information may be SCI sent by the another terminal, the indication information includes the resource reservation field, and the target parameter is a value of the resource reservation field. Assuming that the SCI sent by the another terminal indicates that a set of frequency resources in a subframe whose index is n is a resource that the another terminal uses to transmit data, a same frequency resource in a subframe whose index is (n+the resource reservation field multiplied by the parameter P) is also a resource that the another terminal uses to transmit data, that is, the resource is reserved by the another terminal. If the reserved resource is in the second subframe, when a specific criterion is met, the terminal 200 excludes the reserved resource, and selects a resource from the remaining resources to sent data.

The following further describes the solution of this embodiment of this application with reference to specific examples.

Figure 6:
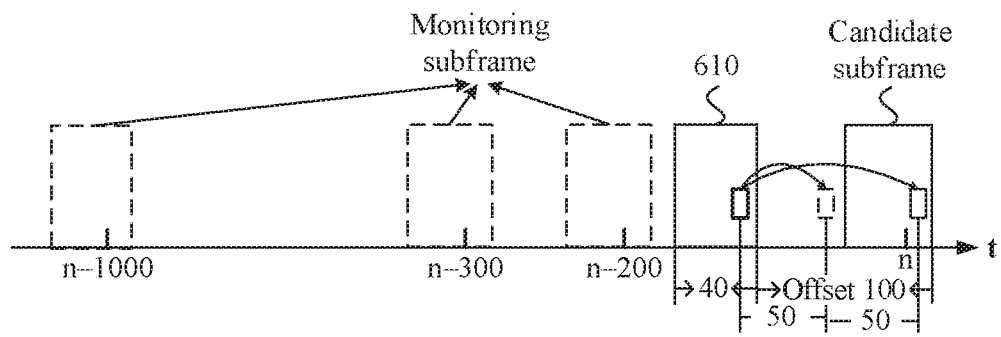
FIG. 6 is an example according to an embodiment of this application.

FIG. 6 is an example according to an embodiment of this application. Refer to FIG. 6.

When a short resource reservation interval of ½*P needs to be supported (for example, it is specified that a terminal needs to support the short resource reservation interval of ½*P, the restrict resource reservation period parameter includes ½, or a value range of the parameter k that is used to determine the monitoring subframe includes ½), it is assumed that a quantity of the subframes in which the candidate resources are located is Y=40, and P=100.

When a solution in which the quantity of the first subframes is M=min(Y,R*P) and the value range of the offset is [a,b] is used to monitor a subframe and select a resource for sending data, where a≥max(Y,R*P) and b≤P, there is the following case:

The terminal 200 needs to monitor min(40,50)=40 subframes. There is an offset between a last subframe of the 40 first subframes and a last subframe of subframes in which 40 candidate resources are located, as shown in FIG. 6. A value range of the offset is [a,b], where a≥max(40,50)=50 and b≤100. For example, a value of the offset may be 50.

An equivalent description of the M first subframes is: There are n−L first subframes, where n subframes are last min(Y,R*P) subframes of the subframes in which Y candidate resources are located. A value range of L is [a,b], where a≥max(Y,R*P) and b≤P.

The indication information of the terminal 100 is received in the M first subframes 610. The indication information indicates that the value of the resource reservation field is equal to ½, and the terminal 200 increases the quantity of reservation times by a scale of 2. An original quantity of reservations times is 1, and an increased quantity of reservation times is 2. The terminal 200 determines the excluded resource according to the quantity of reservation times 2 and the resource reservation interval of the terminal 100. Because the resource reservation interval of the terminal 100 is equal to ½*P, that is, 50, the terminal 200 determines a frequency resource that is reserved in a $50^{th}$ frame and a $100^{th}$ frame after the indication information of the terminal 100 as the excluded resource. The terminal 200 selects, from the candidate resources, a frequency resource that is not reserved in the $50^{th}$ frame and the $100^{th}$ frame after the indication information of the terminal 100, to send data. In this way, although the resource reservation interval is less than P, the quantity of resource reservation times increases, so that a largest interval between a subframe in which the indication information is located and a subframe in which the excluded resource is located is equal to P, thereby avoiding a problem of a resource selection collision caused by an excessively short resource reservation interval.

It should be noted that, in V2X, not all subframes belong to a resource pool used for V2X communication. For example, in an LTE system, a total quantity of subframes in an SFN/DFN period is 10240, subframes that may belong to the V2X resource pool are (t_0, t_1, t_2, . . . , t_max), where 0≤t_i<10240, t_i is a subframe index (a first index) relative to a subframe #0 in SFN/DFN #0, and the subframes are arranged in ascending order of the subframe index, i is an index (a second index) used to number only a set of subframes that may belong to the resource pool used for the V2X communication. For example, (t_0, t_1, t_2, . . . , t_max) is (0, 1, 2, 5, 6, 7, 9, . . . ). In all the embodiments of this specification, the index used for the subframe may be the first index or the second index.

For example, in an embodiment, P-UE monitor s that the M subframes are M subframes in (t_0, t_1, t_2, . . . , t_max). In this case, the second index is used.

It is assumed that a last subframe of the subframes in which the Y candidate resources are located is t_n, and the value range of the offset is [a, b], where a≥max(Y,R*P) and b≤P. Assuming that the offset selected by UE is P, the last subframe of the M subframes is t_(n−P). In this case, the second index is used.

It is assumed that a last subframe of the subframes in which the Y candidate resources are located is n, and the value range of the offset is [a,b], where a≥max(Y,R*P) and b≤P. Assuming that the offset selected by UE is max(Y,R*P), the last subframe of the M subframes is n−max(Y,R*P). In this case, the first index is used.

Figure 7:
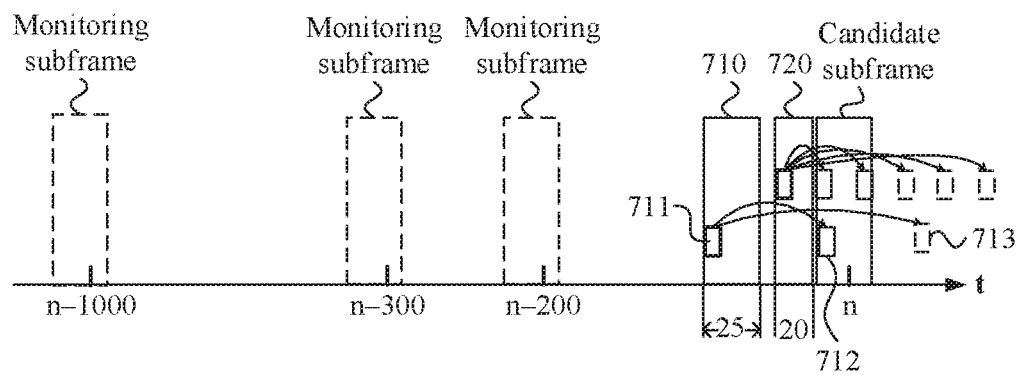
FIG. 7 is another example according to an embodiment of this application.

FIG. 7 is another example according to an embodiment of this application. Refer to FIG. 7.

When short resource reservation intervals ½*P and ⅕*P need to be supported (for example, it is specified that a terminal needs to support the short resource reservation intervals ½*P and ⅕*P, the restrict resource reservation period parameter includes ½ and ⅕, or the parameter k that is used to determine the monitoring subframe includes ½ and ⅕), it is assumed that a quantity of the subframes in which the candidate resources are located is Y=25, and P=100.

When a solution in which the quantity of the first subframes is M=min(Y,R*P) and the value range of the offset is

[a,b] is used to monitor a subframe and select a resource for sending data, where a≥max(Y,R*P) and b≤P, there is the following case:

For the reservation interval of ½*P, the terminal 200 monitor s min=(25,50)=25 subframes. There is an offset between a last subframe of the 25 first subframes and a last subframe of subframes in which 25 candidate resources are located, as shown in FIG. 7. A value range of the offset is [a,b], and the offset is selected based on UE implementation, where a≥max(25,50)=50 and b≤100. Indication information of a terminal 101 is received in the 25 first subframes 710. The indication information is located in a subframe 711. If the value of the resource reservation field indicated by the indication information is equal to ½, the terminal 200 increases the quantity of reservation times by a scale of 2. The terminal 200 determines a reserved resource according to the quantity of reservation times 2 and the resource reservation interval of the terminal 100. Because a resource reservation interval of the terminal 101 is equal to ½*P, that is, 50, the terminal 200 determines a frequency resource that is reserved in a $50^{th}$ frame 712 and a $100^{th}$ frame 713 after the indication information of the terminal 101 as the reserved resource.

In addition, the quantity of reservation times may be applied to only the subframes in which the candidate resources are located. If a reserved resource is not in the subframes in which the candidate resources are located, UE considers that the resource is not reserved. In this embodiment shown in FIG. 7, it may be considered that a resource in the $100^{th}$ frame 713 is not the resource reserved by the terminal 101.

For the reservation interval of ⅕*P, the terminal 200 monitor s min(25, 20'=20 subframes. There is an offset between a last subframe of the 20 first subframes and a last subframe of subframes in which 25 candidate resources are located, as shown in the following figure. A value range of the offset is [a,b], and the offset is selected based on UE implementation, where a≥max(25,20)=25 and b≤100. Indication information of a terminal 102 is received in the 20 first subframes 720. The indication information indicates that a value of the resource reservation field is equal to ⅕, and the terminal 200 increases the quantity of reservation times by a scale of 5. The 20 first subframes may be independent from, may overlap with, or do not overlap with the foregoing 40 first subframes. FIG. 7 shows a non-overlapping case. The terminal 200 determines a reserved resource according to the quantity of reservation times 5 and the resource reservation interval of the terminal 102. Because a resource reservation interval of the terminal 100 is equal to ⅕*P, that is, 20, the terminal 200 determines a frequency resource that is reserved in a $20^{th}$ frame, a $40^{th}$ frame, a $60^{th}$ frame, an $80^{th}$ frame, and a $100^{th}$ frame after the indication information of the terminal 102 as the reserved resource.

The terminal 200 does not select, from the candidate resources, the frequency resource that is reserved in the $50^{th}$ frame and the $100^{th}$ frame after the indication information of the terminal 101 and the resource that is reserved in the $20^{th}$ frame, the $40^{th}$ frame, the $60^{th}$ frame, the $80^{th}$ frame, and the $100^{th}$ frame after the indication information of the terminal 102, to send data. According to this embodiment of this application, when a terminal may support different resource reservation intervals less than P, the terminal may separately perform monitoring and determine a reserved resource according to the resource reservation intervals, so as to reduce a probability of a resource collision.

Figure 8:
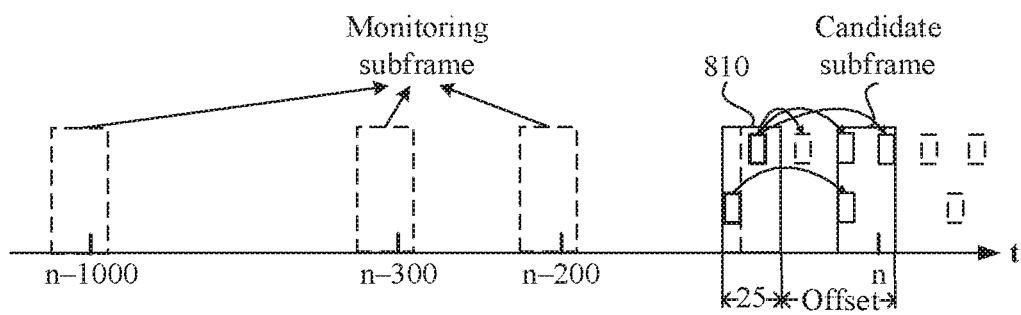
FIG. 8 is still another example according to an embodiment of this application.

FIG. 8 is still another example according to an embodiment of this application. Refer to FIG. 8.

When short resource reservation intervals ½*P and ⅕*P need to be supported (for example, it is specified that a terminal needs to support the short resource reservation intervals ½*P and ⅕*P, the restrict resource reservation period parameter includes ½ and ⅕, or the parameter k that is used to determine the monitoring subframe includes ½ and ⅕), it is assumed that a quantity of the subframes in which the candidate resources are located is Y=25, and P=100.

When a solution in which the quantity of the first subframes is M=min(Y,max(R)*P) or M=min(Y,max(R*P)), and the value range of the offset is [a,b] is used to monitor a subframe and select a resource for sending data, where a≥max(Y,R*P) and b≤P, there is the following case:

The terminal 200 monitor s min(25,max(½, ⅕)*100)=25 subframes. There is an offset between a last subframe of the 25 first subframes and a last subframe of subframes in which 25 candidate resources are located, as shown in FIG. 8. A value range of the offset is [a,b], and the offset is selected based on UE implementation, where a≥max(25,max(½,⅕)*100)=50 and b≤100.

If a value of the resource reservation field indicated by indication information that is received in the 25 first subframes 810 and that is sent by the terminal 101 is equal to ½, the terminal 200 increases the quantity of reservation times by a scale of 2. If a value of the resource reservation field indicated by indication information that is received in last 20 subframes of the 25 subframes and that is sent by the terminal 102 is equal to ⅕, the terminal 200 increases the quantity of reservation times by a scale of 5. The terminal 200 selects, according to an increased quantity of reservation times, a resource for sending data.

Figure 9:
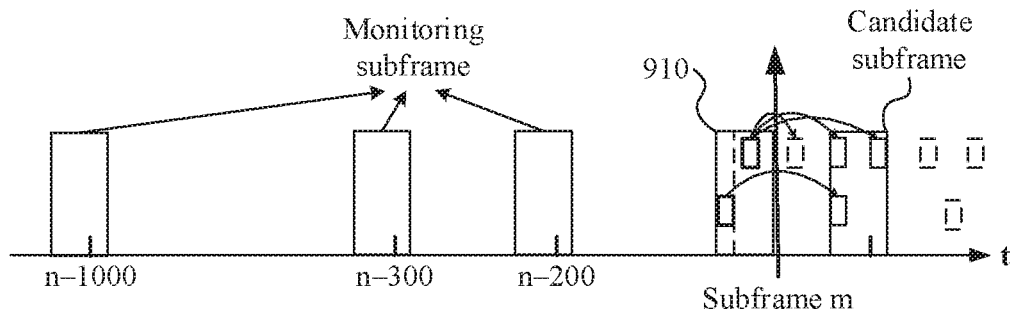
FIG. 9 is yet another example according to an embodiment of this application.

FIG. 9 is yet another example according to an embodiment of this application. Refer to FIG. 9.

When short resource reservation intervals ½*P and ⅕*P need to be supported (for example, it is specified that the terminal 200 needs to support the short resource reservation intervals ½*P and ⅕*P, the restrict resource reservation period parameter includes ½ and ⅕, or the parameter k that is used to determine the monitoring subframe includes ½ and ⅕), it is assumed that a quantity of the subframes in which the candidate resources are located is Y=25, and P=100.

There is the following case when the quantity of the first subframes is M=min(Y,max(R)*P) and the value range of the offset is determined according to a preset rule, where the preset rule is that the first subframe is previous to a subframe m in which the UE determines that a set of resources are to be excluded, that is, M subframes are or that the first subframe is previous to a subframe m in which the UE determines to select or reselect a resource, that is, M subframes are [m−1, m−]:

The terminal 200 monitors min(25,max(½,⅕)*100)=25 subframes. The 25 first subframes are previous to a subframe m in which the UE determines that a set of resources are to be excluded. That is, the first subframes are [m−1,m−25].

If a value of the resource reservation field indicated by indication information that is received in the 25 first subframes 910 and that is sent by the terminal 101 is equal to ½, the terminal 200 increases the quantity of reservation times by a scale of 2. If a value of the resource reservation field indicated by indication information that is received in last 20 subframes of the 5 subframes and that is sent by the terminal 102 is equal to ⅕, the terminal 200 increases the quantity of reservation times by a scale of 5.

Figure 10:
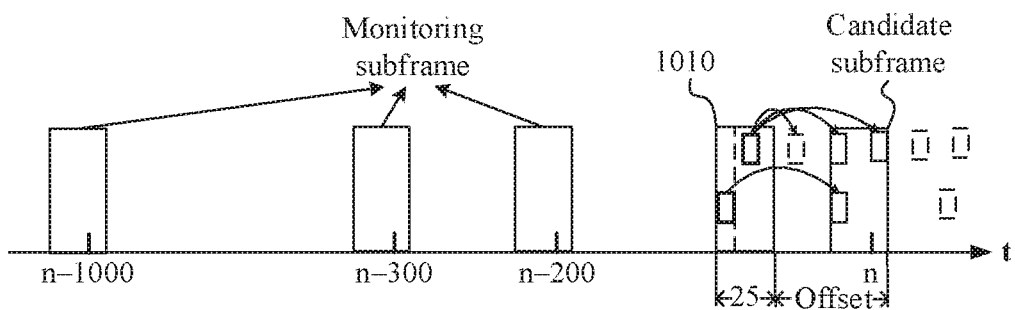
FIG. 10 is yet another example according to an embodiment of this application.

FIG. 10 is yet another example according to an embodiment of this application. Refer to FIG. 10.

When short resource reservation intervals ½*P and ⅕*P need to be supported (for example, it is specified that the terminal 200 needs to support the short resource reservation intervals ½*P and ⅕*P, the restrict resource reservation period parameter includes ½ and ⅕, or the parameter k that is used to determine the monitoring subframe includes ½ and ⅕), it is assumed that a quantity of the subframes in which the candidate resources are located is Y=25, and P=100.

When the quantity of the first subframes is M=min(Y,max(R)*P) and the value range of the offset is determined according to a preset rule, there is the following case:

The terminal 200 monitor s min(25,max(½,⅕)*100)=25 subframes. There is an offset between a last subframe of the 25 first subframes and a last subframe of subframes in which 25 candidate resources are located, as shown in the following figure. A value of the offset is preconfigured. For example, the terminal 200 determines that the offset is P=100.

If a value of the resource reservation field indicated by indication information that is received in the 25 first subframes 1010 and that is sent by the terminal 101 is equal to ½, the terminal 200 increases the quantity of reservation times by a scale of 2. If a value of the resource reservation field indicated by indication information that is received in last 20 subframes of the 25 subframes and that is sent by the terminal 101 is equal to ⅕, the terminal 200 increases the quantity of reservation times by a scale of 5.

Figure 11:
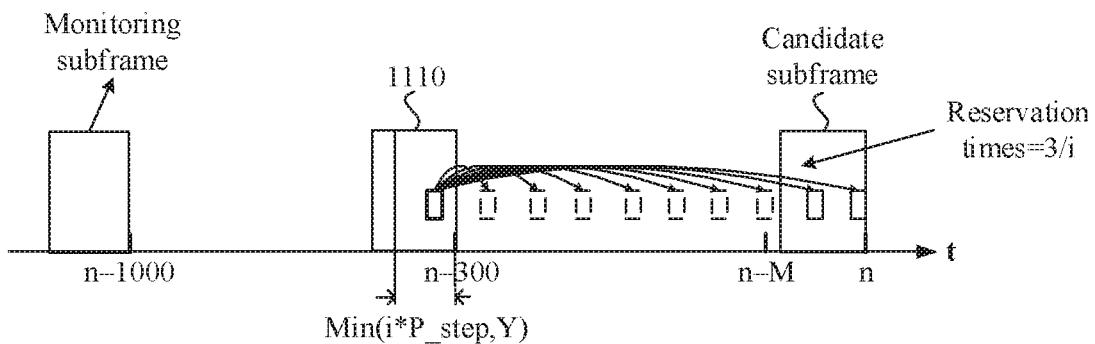
FIG. 11 is yet another example according to an embodiment of this application.

FIG. 11 is yet another example according to an embodiment of this application. Refer to FIG. 11.

When short resource reservation intervals ½*P and ⅕*P need to be supported (for example, it is specified in a standard that a terminal needs to support the short resource reservation intervals ½*P and ⅕*P, the restrict resource reservation period parameter includes ½ and ⅕, or the parameter k that is used to determine the monitoring subframe includes ½ and ⅕), it is assumed that a quantity of the subframes in which the candidate resources are located is Y=25, and P=100. The preconfigured parameter that is used to determine the monitoring subframe is k=½, 3, 10. A minimum value of k greater than or equal to 1 is 3.

When the quantity of reservation times is obtained by dividing the seventh parameter by the target parameter, a specific case is as follows:

A resource reservation field indicated by indication information that is received by the terminal 200 in last min(⅕*100,25)=20 first subframes 1110 of n−P*3 subframes and that is sent by the terminal 101 is ⅕, the quantity of reservation times is calculated by a scale of 3*5=15, and the calculated quantity of reservation times is 15.

A resource reservation field indicated by indication information that is received by the terminal 200 in last min(½*100,25)=25 subframes of the n−P*3 subframes and that is sent by the terminal 102 is ½, the quantity of reservation times is calculated by a scale of 3*2=6, and the calculated quantity of reservation times is 6.

Figure 12:
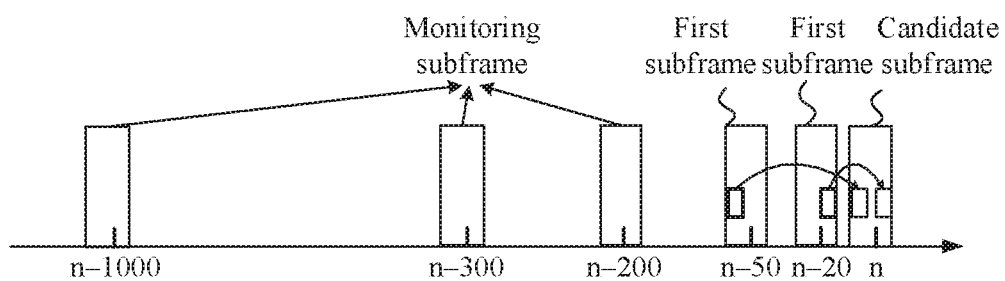
FIG. 12 is yet another example according to an embodiment of this application.

FIG. 12 is yet another example according to an embodiment of this application. Refer to FIG. 12.

When short resource reservation intervals ½*P and ⅕*P need to be supported (for example, it is specified that a terminal needs to support the short resource reservation intervals ½*P and ⅕*P, the restrict resource reservation period parameter includes ½ and ⅕, or the parameter k that is used to determine the monitoring subframe includes ½ and ⅕), and P=100, a quantity of the subframe in which the candidate resources of the terminal 200 are located cannot exceed min(½,⅕)*100=20.

Figure 13:
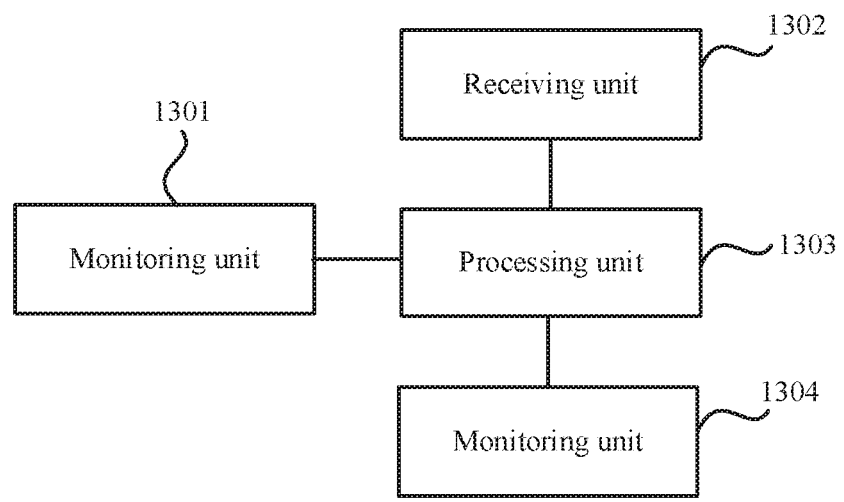
FIG. 13 is a schematic structural diagram of a resource selection apparatus according to an embodiment of this application.

When a solution in which the quantity of the candidate subframes does not exceed the first parameter, a specific case is as follows:

The first subframes of the terminal 200 are n−100*⅕ and n−100*½, where a subframe n is any one of subframes in which Y candidate resources are located, as shown in FIG. 13. The terminal 200 receives, in the first subframe, the indication information sent by the terminal 100, and determines a resource reserved by the terminal 100 according to the indication information.

FIG. 13 is a schematic structural diagram of a resource selection apparatus according to an embodiment of this application. As shown in FIG. 13, the apparatus specifically includes:

a monitoring unit 1301, configured to monitor, by a first terminal, a first subframe where a quantity of the first subframes is less than or equal to a quantity of second subframes;

a receiving unit 1302, configured to receive indication information in the first subframe;

a processing unit 1303, configured to determine a first resource in the second subframe according to the indication information; and a sending unit 1304, configured to select, according to the first resource, a resource in the second subframe for the first terminal to send data.

Optionally, the processing unit 1303 is further configured to determine the quantity of the first subframes according to at least one first parameter. A value of the first parameter is included in a value range of a resource reservation interval.

Optionally, the first parameter is equal to a product of a value of a third parameter less than 1 and a second parameter, where the third parameter is a parameter that is configured by a network-side device or preconfigured and that is used by the first terminal to determine a monitoring subframe.

Alternatively, the third parameter is a restrict resource reservation period parameter that is configured by a network-side device or preconfigured.

Optionally, the quantity of the first subframes is equal to a minimum value of the quantity of the second subframes and the first parameter.

Optionally, the quantity of the first subframes is equal to a minimum value of a maximum value of the first parameter and the quantity of the second subframes.

Optionally, an interval between a last subframe of the first subframe and a last subframe of the second subframe is determined according to at least one of the first parameter, the quantity of the second subframes, or the second parameter, and the value of the first parameter is included in the value range of the resource reservation interval.

Optionally, that an interval between a last subframe of the first subframe and a last subframe of the second subframe is determined according to at least one of the first parameter, the quantity of the second subframes, or the second parameter includes:

the interval between the last subframe of the first subframe and the last subframe of the second subframe is greater than or equal to a fourth parameter and less than or equal to a fifth parameter, where the fourth parameter is greater than or equal to a maximum value of the first parameter and the quantity of the second subframes, and the fifth parameter is less than or equal to the second parameter.

Optionally, the last subframe of the first subframe is a previous subframe of a subframe in which the first terminal determines that a set of resources are excluded.

Alternatively, the interval between the last subframe of the first subframe and the last subframe of the second subframe is a sixth parameter, where the sixth parameter is not greater than the second parameter.

Optionally, the processing unit 1303 is further configured to determine the first resource according to a seventh parameter and a target parameter. The indication information is used to indicate the target parameter, and the seventh parameter is determined according to the target parameter.

Optionally, that the seventh parameter is determined according to the target parameter includes: the seventh parameter is obtained by dividing 1 by the target parameter.

Optionally, that the seventh parameter is determined according to the target parameter includes: the seventh parameter is obtained by dividing a minimum value of at least one third parameter not less than 1 by the target parameter, and the third parameter is a parameter that is configured by a network-side device or preconfigured and that is used by the first terminal to determine a monitoring subframe.

Optionally, the quantity of the second subframes does not exceed the first parameter, and the value of the first parameter is included in the value range of the resource reservation interval.

Optionally, the value range of the resource reservation interval is equal to a product of a value of a resource reservation field less than 1 in a value range and the second parameter.

Figure 14:
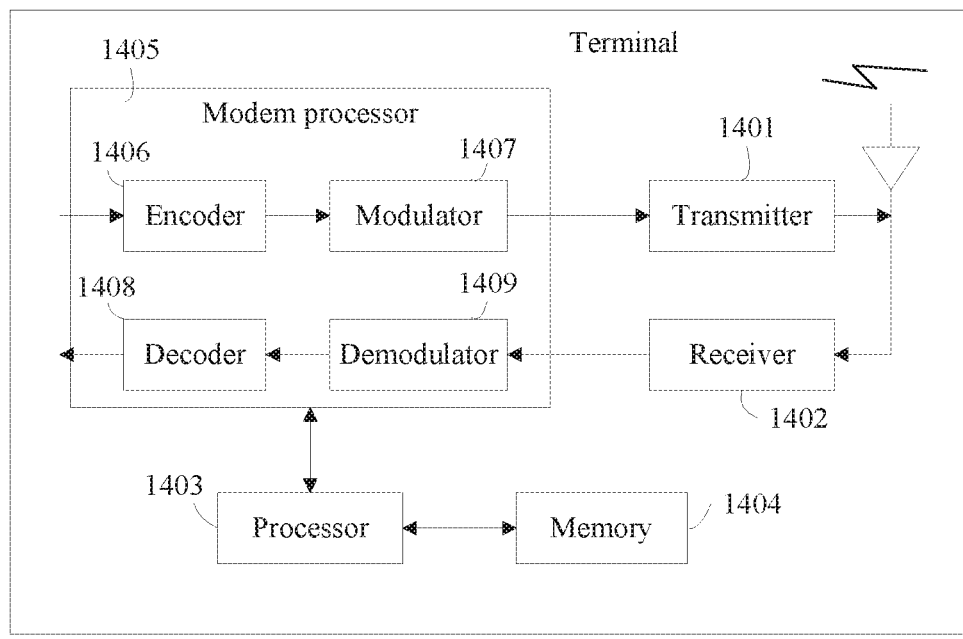
FIG. 14 is a schematic structural diagram of a terminal according to an embodiment of this application.

FIG. 14 is a schematic structural diagram of a terminal according to an embodiment of this application. As shown in FIG. 14, the terminal may include at least a transmitter 1401, a receiver 1402, a processor 1403, and a memory 1404. The processor 1403, the transmitter 1401, the receiver 1402, and the memory 1404 may be connected and communicate with each other by using a bus (which is not shown but should be known by a person skilled in the art). A receiving unit and a sending unit may be included. In addition, the transmitter 1401 and the receiver 1402 may be integrated as a transceiver. The memory 1404 is configured to store a program and data.

The transmitter 1401 is configured to send data and an instruction to a base station or another terminal in a wireless manner. The receiver 1402 is configured to receive, in a wireless manner, the data and the instruction sent by a base station or another terminal. The transmitter and the receiver may be further implemented in a form shown in FIG. 14 that the receiving unit and the second unit are included. Any communications standard or protocol may be used in wireless communications, including but not limited to a Global system for mobile communications (Global System of Mobile Communication, GSM), general packet radio service (General Packet Radio Service, GPRS), code division multiple access (Code Division Multiple Access, CDMA), wideband code division multiple access (Wideband Code Division Multiple Access, WCDMA), Long Term Evolution (Long Term Evolution, LIE), email, and a short message service (Short Messaging Service, SMS), and the like.

The terminal may further include a modem processor 1405. In the modem processor 1405, an encoder 1406 receives service data and a signaling message that are to be sent on an uplink, and processes (for example, formats, encodes, and interleaves) the service data and the signaling message. A modulator 1407 further processes the encoded service data and signaling message (for example, performs symbol mapping and modulation) and provides an output sample. A demodulator 1409 processes (for example, demodulates) the input sample and provides symbol estimation. A decoder 1408 processes (for example, de-interleaves and decodes) the symbol estimation and provides the decoded data and signaling message to UE. The encoder 1406, the modulator 1407, the demodulator 1409, and the decoder 1408 may be implemented by the combined modem processor 1405. These units perform processing according to a radio access technology (for example, LIE or another evolved system access technology) used by a radio access network.

The processor 1403 controls and manages an action of the terminal and is configured to perform processing implemented by the terminal in the foregoing embodiments. For example, the processor 1403 is configured to control the terminal to monitor a first subframe and/or complete other procedures of the technology described in the present invention. In an example, the processor 1403 is configured to help the terminal to perform a procedure from S520 to S540 in FIG. 5. The memory 1404 is configured to store program code and data of the terminal.

FIG. 14 shows only a simplified design of the terminal. In actual application, a base station may include any quantity of transmitters, receivers, processors, controllers, memories, and the like, and all terminals that may implement the present invention fall within the protection scope of the present invention.

It should be noted that the processor described in FIG. 14 may be one processor, or may be a collective term of multiple processing elements. For example, the processor may be a central processing unit (Central Processing Unit, CPU), or an application-specific integrated circuit (Application Specific Integrated Circuit, ASIC), or be configured as one or more integrated circuits that implement the embodiments of the present invention.

The memory may be one storage apparatus or may be a collective term of multiple storage elements, and is configured to store executable program code or a parameter, data, and the like that are required for running an access network management device. The memory may include a random access memory (random access memory, RAM) or may include a non-volatile memory (non-volatile memory), such as a magnetic disk storage or a flash memory (Flash). The processor and the memory may be integrated into a processing circuit.

A person skilled in the art may be further aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

A person of ordinary skill in the art may understand that all or a part of the steps in each of the foregoing method of the embodiments may be implemented by a program instructing a processor. The foregoing program may be stored in a computer readable storage medium. The storage medium may be a non-transitory (non-transitory) medium, The foregoing descriptions are merely examples of specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method implemented by a first terminal, wherein the method comprises:
    determining a quantity of first subframes based on a quantity of second subframes and a first parameter, wherein the quantity of the first subframes is less than or equal to the quantity of the second subframes, wherein the first parameter is equal to a product of a value of a second parameter and a value of a third parameter that is greater than zero and less than one, wherein the first parameter is different than the third parameter, wherein the third parameter is a restrict resource reservation period parameter that is either preconfigured or is configured by a network-side device, wherein an interval between a last subframe of the first subframes and a last subframe of the second subframes is a fourth parameter, and wherein the fourth parameter is not greater than the second parameter;
    monitoring the first subframes;
    receiving indication information in the first subframes;
    determining, according to the indication information, a first resource in the second subframes that is reserved by another terminal; and
    selecting, from remaining resources in the second subframes excluding the first resource, a second resource in the second subframes for the first terminal to send data.

2. The method of claim 1, further comprising determining the quantity of the first subframes by determining a minimum value of the quantity of the second subframes and the first parameter.

3. The method of claim 2, wherein the third parameter is configured by a network-side device, wherein the second parameter is a scale factor, and wherein a resource reservation interval is based on the scale factor.

4. The method of claim 1, wherein determining the first resource according to the indication information comprises determining the first resource according to a fifth parameter and a target parameter, wherein the indication information indicates the target parameter, and wherein the fifth parameter is determined according to the target parameter.

5. The method of claim 4, wherein the fifth parameter is determined by dividing one by the target parameter.

6. The method of claim 1, wherein a value of the second parameter is greater than the quantity of the second subframes.

7. A terminal, comprising:
    a receiver configured to receive indication information in first subframes;
    a processor coupled to the receiver and configured to:
        determine a quantity of the first subframes based on a quantity of second subframes and a first parameter, wherein the quantity of the first subframes is less than or equal to the quantity of the second subframes, wherein the first parameter is equal to a product of a value of a second parameter and a value of a third parameter that is greater than zero and less than one, wherein the first parameter is different than the third parameter, wherein the third parameter is a restrict resource reservation period parameter that is either preconfigured or is configured by a network-side device, wherein an interval between a last subframe of the first subframes and a last subframe of the second subframes is a fourth parameter, and wherein the fourth parameter is not greater than the second parameter;
    monitor the first subframes;
    determine, according to the indication information, a first resource in the second subframes that is reserved by another terminal; and
    select, from remaining resources in the second subframes excluding the first resource, a second resource in the second subframes for the terminal to send data.

8. The terminal of claim 7, wherein the quantity of the first subframes is equal to a minimum value of the quantity of the second subframes and the first parameter.

9. The terminal of claim 8, wherein the third parameter is configured by the network-side device, and wherein the second parameter is a scale factor.

10. The terminal of claim 7, wherein the processor is further configured to determine the first resource according to a fifth parameter and a target parameter, wherein the indication information indicates the target parameter, and wherein the fifth parameter is determined according to the target parameter.

11. The terminal of claim 10, wherein the fifth parameter is obtained by dividing one by the target parameter.

12. The terminal of claim 7, wherein the third parameter is preconfigured.

13. A computer program product comprising processor executable instructions that, when executed by a processor, cause a first terminal to be configured to:
    determine a quantity of first subframes based on a quantity of second subframes and a first parameter, wherein the quantity of the first subframes is less than or equal to the quantity of the second subframes, wherein the first parameter is equal to a product of a value of a second parameter and a value of a third parameter that is greater than zero and less than one, wherein the first parameter is different than the third parameter, wherein the third parameter is a restrict resource reservation period parameter that is either preconfigured or is configured by a network-side device, wherein an interval between a last subframe of the first subframes and a last subframe of the second subframes is a fourth parameter, and wherein the fourth parameter is not greater than the second parameter;
    monitor the first subframes;
    receive indication information in the first subframes;
    determine, according to the indication information, a first resource in the second subframes that is reserved by another terminal; and
    select, from remaining resources in the second subframes excluding the first resource, a second resource for the first terminal to send data.

14. The computer program product of claim 13, wherein the quantity of the first subframes is equal to a minimum value of the quantity of the second subframes and the first parameter.

15. The computer program product of claim 14, wherein the third parameter is configured by the network-side device, and wherein the second parameter is a scale factor.

16. The computer program product of claim 13, wherein the first resource is determined according to a fifth parameter and a target parameter, wherein the indication information indicates the target parameter, and wherein the fifth parameter is determined according to the target parameter.

17. The computer program product of claim 16, wherein the fifth parameter is obtained by dividing one by the target parameter.

* * * * *